United States Patent
Funaki et al.

(10) Patent No.: US 7,351,342 B2
(45) Date of Patent: Apr. 1, 2008

(54) METHOD FOR RECOVERING FLUORINE-CONTAINING EMULSIFIER

(75) Inventors: Hiroshi Funaki, Chiba (JP); Koichi Yanase, Chiba (JP); Hiroki Kamiya, Chiba (JP); Masao Uehara, Chiba (JP); Kenichiro Nagatomo, Chiba (JP); Yasushi Nishimura, Osaka (JP); Shiro Ohno, Osaka (JP); Satoru Hirano, Tokyo (JP)

(73) Assignees: Asahi Glass Company, Limited, Tokyo (JP); Sasakura Engineering Co., Ltd., Osaka (JP)

( * ) Notice: Subject to any disclaimer, the term of this patent is extended or adjusted under 35 U.S.C. 154(b) by 410 days.

(21) Appl. No.: 11/012,334

(22) Filed: Dec. 16, 2004

(65) Prior Publication Data
US 2005/0150833 A1    Jul. 14, 2005

Related U.S. Application Data

(63) Continuation of application No. PCT/JP03/07772, filed on Jun. 19, 2003.

(30) Foreign Application Priority Data
Jun. 19, 2002   (JP) ............................. 2002-178728

(51) Int. Cl.
    *C02F 1/58*   (2006.01)
(52) U.S. Cl. ...................... 210/708; 210/808
(58) Field of Classification Search ............. 210/708, 210/767, 808
    See application file for complete search history.

(56) References Cited

U.S. PATENT DOCUMENTS

| 4,369,266 A | * | 1/1983 | Kuhls et al. ............. 523/332 |
| 4,952,290 A | | 8/1990 | Carnarius et al. |
| 5,312,935 A | | 5/1994 | Mayer et al. |
| 6,518,442 B1 | * | 2/2003 | Felix et al. ............... 554/177 |
| 2003/0098282 A1 | | 5/2003 | Funaki et al. |
| 2003/0125421 A1 | * | 7/2003 | Bladel et al. ............. 523/310 |
| 2004/0072977 A1 | * | 4/2004 | Kaulbach et al. ......... 526/247 |

FOREIGN PATENT DOCUMENTS

| EP | 0 716 867 A1 | 6/1996 |
| JP | 7-8704 | 1/1995 |
| JP | 10-57702 | 3/1998 |
| JP | 2003-160531 | 6/2003 |
| WO | WO 02/13953 | 2/2002 |

* cited by examiner

*Primary Examiner*—Robert A. Hopkins
(74) *Attorney, Agent, or Firm*—Oblon, Spivak, McClelland, Maier & Neustadt, P.C.

(57) ABSTRACT

An aqueous solution containing a fluorine-containing emulsifier in a low concentration of at least 1 ppm by mass and at most 1% by mass (e.g., coagulation waste water after an emulsion polymerization of a fluoropolymer and/or an aqueous solution obtained by washing with an aqueous solution a waste gas from a drying process and/or a heat treating process of the fluoropolymer) is subjected to vacuum concentration under a pressure of at most 100 kPa and a temperature of the aqueous solution of at most 100° C. by means of a heating tube surface evaporation type concentrator equipped with a heat pump or the like, and the fluorine-containing emulsifier is recovered from a highly concentrated aqueous solution containing the fluorine-containing emulsifier in a higher concentration of at least 5% by mass. According to the present method, the fluorine-containing emulsifier can be recovered with a high yield from a low-concentration liquid such as coagulation waste water of a fluoropolymer.

16 Claims, No Drawings

METHOD FOR RECOVERING FLUORINE-CONTAINING EMULSIFIER

TECHNICAL FIELD

The present invention relates to a method for recovering a fluorine-containing emulsifier by means of a vacuum concentration method.

BACKGROUND ART

Heretofore, the technology using an anion exchange resin (hereinafter referred to as IER) has been known as a method of recovering a fluorine-containing emulsifier used for an emulsion polymerization of a fluoropolymer.

JP-B-47-51233 describes a method wherein latex resulting from emulsion polymerization is coagulated and washed; an emulsifier is collected as an aqueous solution; the aqueous solution thus obtained is evaporated to dryness; and then the fluorine-containing emulsifier is recovered with an organic solvent. Furthermore, its specification describes a recovery method of the fluorine-containing emulsifier with the use of an anion exchange resin.

U.S. Pat. No. 4,282,162 describes a method wherein a dilute aqueous solution of an emulsifier is brought into contact with a weakly basic anion exchange resin in a pH range of from 0 to 7 to adsorb the emulsifier on the resin and wherein it is desorbed with aqueous ammonia.

WO99/62830 describes a method of adding a nonionic or cationic surfactant to coagulation waste water of a fluoropolymer to stabilize fine particles of polytetrafluoroethylene (hereinafter referred to as PTFE) in the coagulation waste water, thereby preventing clogging of a packed column of IER.

JP-A-55-120630, U.S. Pat. No. 4,369,266 and DE 2,908,001 describe a method wherein coagulation waste water of PTFE is concentrated by means of an ultrafiltration method, and at the same time, a part of ammonium perfluorooctanoate (hereinafter referred to as APFO) used in the production of PTFE is recovered, and then APFO is adsorbed and recovered with IER.

JP-A-55-104651, U.S. Pat. No. 4,282,162 and DE 2,903,981 describe a method of adsorbing APFO on IER and then desorbing and recovering perfluorooctanoic acid with the use of a mixture of an acid and an organic solvent.

WO99/62858 describes a method wherein lime water is preliminarily added to coagulation waste water of a tetrafluoroethylene/perfluoro(alkyl vinyl ether)copolymer (hereinafter referred to as PFA) to adjust the pH to a level of from 6 to 7.5; then a metal salt such as aluminum chloride or iron chloride is added to coagulate the non-coagulated PFA; then the coagulates are mechanically separated and removed; thereafter the pH of the resultant waste water is adjusted to a level of at most 7 with sulfuric acid; and APFO is adsorbed and recovered by means of strongly basic IER.

JP-A-2001-62313 describes a method of desorbing APFO adsorbed on IER with the use of a mixture of water, an alkali and an organic solvent.

JP-A-2002-59160 describes a method of desorbing a fluorine-containing emulsifier adsorbed on IER with the use of a mixture of water, an alkali (especially, sodium hydroxide) and an organic solvent (especially, methanol, ethanol or acetonitrile).

Furthermore, JP-A-2002-58966 describes a method of concentrating and recovering a fluorine-containing emulsifier by means of a reverse osmosis membrane.

In addition, The Chemical Society of Japan, 76th Spring Meetings and The Chemical Society of Japan, 80th Fall Meetings have reported the technology of recovering perfluorooctanoic acid and its ammonium salt by use of a layered double hydroxide of aluminum and zinc.

WO02/10104A1 and WO02/10105A1 describe a method for recovering a fluorine-containing emulsifier by adding a bivalent metal and a trivalent metal to an aqueous solution containing a fluorine-containing emulsifier, thereby forming a layered double hydroxide.

However, in the methods using IER and the method using the reverse osmosis membrane, it is necessary to remove a suspended solid and/or a substance convertible to a suspended solid (hereinafter collectively referred to as the SS component) containing a non-coagulated fluorine-containing polymer, prior to contact with the IER or the reverse osmosis membrane. The removal of the SS component considerably affects a recovery efficiency of the fluorine-containing emulsifier, and there remain many problems in actual operations, including a problem that no quite effective method of removing the SS component has been found.

Furthermore, in the recovering method using the layered double hydroxide reported in The Chemical Society of Japan, 76th Spring Meetings and The Chemical Society of Japan 80th Fall Meetings, and the recovering method described in WO02/10104A1 and WO02/10105A1, there was a problem that a recycle efficiency was not sufficiently increased after recovery of the fluorine-containing emulsifier, because the other chemical substances such as the bivalent metal and the trivalent metal had to be added for recovering the fluorine-containing emulsifier.

Heretofore, in a case wherein a fluorine-containing emulsifier was recovered by evaporating to dryness, there were problems that an extremely large amount of energy was required and that the fluorine-containing emulsifier was also lost together with water during evaporation of water.

The present invention has been accomplished under such circumstances and it is an object of the present invention to provide a method for simply and efficiently recovering a fluorine-containing emulsifier from a low-concentration aqueous solution such as coagulation waste water of a fluoropolymer.

DISCLOSURE OF THE INVENTION

The present invention provides a method for recovering a fluorine-containing emulsifier, which comprises subjecting an aqueous solution (A) containing a fluorine-containing emulsifier in a concentration of at least 1 ppm by mass and at most 1% by mass, to vacuum concentration under a pressure of at most 100 kPa and a temperature of the aqueous solution (A) of at most 100° C., to obtain a concentrated aqueous solution (B) containing the fluorine-containing emulsifier in a higher concentration, and recovering the fluorine-containing emulsifier from the aqueous solution (B).

In the present invention, the concentration of the fluorine-containing emulsifier is preferably at least 5% by mass in the aqueous solution (B), in order to efficiently recover the fluorine-containing emulsifier at a high recovery rate.

BEST MODE FOR CARRYING OUT THE INVENTION

In the present invention, the concentration of the fluorine-containing emulsifier in the aqueous solution (A) is at least 1 ppm by mass and at most 1% by mass, preferably at least 10 ppm by mass and at most 1% by mass, and particularly preferably at least 10 ppm by mass and at most 5000 ppm by mass.

If the concentration of the fluorine-containing emulsifier in the aqueous solution (A) is too low, a large amount of energy is required to concentrate the solution into the highly concentrated aqueous solution (B), particularly into the aqueous solution (B) containing the fluorine-containing emulsifier in the preferred concentration (at least 5% by mass). On the other hand, if the concentration of the fluorine-containing emulsifier in the aqueous solution (A) is too high, there is not much point in carrying out the specific vacuum concentration according to the present invention. In such a high-concentration case, the fluorine-containing emulsifier may be directly used in the recovery step or can be recovered by such a simpler and more efficient method that the fluorine-containing emulsifier is precipitated by changing the pH.

The aqueous solution (A) in the present invention is preferably at least one member selected from the group consisting of waste water (A1) obtained after separation of a fluoropolymer in a process for producing the fluoropolymer by an emulsion polymerization or an aqueous dispersion polymerization of at least one kind of fluoromonomer in an aqueous medium containing the fluorine-containing emulsifier, and an aqueous solution (A2) containing the fluorine-containing emulsifier obtained by washing with an aqueous solution a waste gas from a drying process and/or a heat treating process of the fluoropolymer.

The waste water (A1) obtained after separation of the fluoropolymer is normally preferably a coagulation waste water of a fluoropolymer after an emulsion polymerization or an aqueous dispersion polymerization, and particularly preferably a coagulation waste water from a process for producing a polymer of a fluoromonomer or a copolymer of a fluoromonomer and a monomer other than the fluoromonomer.

Specifically, the coagulation waste water from the production process means waste water obtained after a process wherein a fluoromonomer, or a fluoromonomer and a monomer other than the fluoromonomer are subjected to an emulsion polymerization or an aqueous dispersion polymerization in an aqueous medium containing a fluorine-containing emulsifier to obtain an aqueous dispersion of a fluoropolymer; the fluoropolymer is coagulated from the aqueous dispersion by salting out or the like; and then the fluoropolymer is separated. The waste water contains not only the fluorine-containing emulsifier used in the polymerization of the fluoromonomer but also the SS component such as a non-coagulated fluoropolymer. The coagulation waste water (which will be sometimes referred to hereinafter as coagulation waste water (aA)) will be explained below as a typical example of the aqueous solution (A) in the present invention.

Furthermore, the waste gas in the aqueous solution (A2) is normally preferably a waste gas from a drying process and/or a heat treating process of a fluoropolymer obtained by an emulsion polymerization or an aqueous dispersion polymerization in an aqueous solution containing a fluorine-containing emulsifier.

A typical example of the waste gas is a waste gas containing a small amount of droplets of a solid, discharged from a heat-treating apparatus in a process wherein a fluoromonomer, or a fluoromonomer and a monomer other than the fluoromonomer are subjected to an emulsion polymerization or an aqueous dispersion polymerization in an aqueous medium containing a fluorine-containing emulsifier to obtain an aqueous dispersion of a fluoropolymer; the fluoropolymer is coagulated from the aqueous solution by salting-out or the like to be separated; and the fluoropolymer thus separated is dried and/or thermally treated by means of the heat-treating apparatus such as an oven. Hereinafter, an aqueous solution containing the fluorine-containing emulsifier, obtained by washing the waste gas with an aqueous solution (which will be sometimes referred to hereinafter as aqueous solution (A2a)) will be explained as a typical example of the aqueous solution (A2).

A suspended solid such as a non-coagulated fluoropolymer contained in the coagulation waste water (aA), or a substance convertible to a suspended solid such as a metal salt used in salting-out to coagulate the fluoropolymer, a substance precipitated by change of pH of the coagulation waste water, or a substance precipitated by increase or decrease of the temperature of the coagulation waste water (hereinafter the suspended solid and the substance convertible to the suspended solid will be collectively referred to as the SS component) can adhere to an interior of a concentrator in the vacuum concentration according to the present invention to decrease the heat efficiency. Therefore, the content of the SS component is preferably at most 0.3% by mass, particularly preferably at most 0.05% by mass.

An effective method for removing the SS component such as the non-coagulated fluoropolymer is salting-out of coagulating the SS component by adding a metal salt containing a polyvalent metal cation (a salting-out agent). Specific examples of the metal salt include metal chlorides such as aluminum chloride, aluminum chloride hexahydrate, magnesium chloride, magnesium chloride hexahydrate, ferrous chloride, ferric chloride, ferric chloride hexahydrate and polyaluminum chloride.

Since a coagulate obtained by the salting-out sometimes precipitates in a state of including the fluorine-containing emulsifier, it is preferable to re-dissolve the fluorine-containing emulsifier from the coagulate into water by addition of sodium hydroxide and/or potassium hydroxide to control the pH to at least 7.

In the above-mentioned salting-out, it is preferable to stir the coagulation waste water (aA) during adding the salting-out agent to the coagulation waste water (aA). The stirring method is not particularly limited, but is preferably one using a stirring apparatus which does not mechanically destroy the resulting coagulated particles by stirring. An agitator for the stirring apparatus is preferably an agitator capable of uniformly mixing the entire waste water (aA) at a low rotational speed, and is preferably one type selected from the group consisting of a FULLZONE impeller, a MAXBLEND impeller and an anchor impeller. A G value during stirring with the agitator is preferably from 1 to 300 $s^{-1}$, more preferably from 5 to 250 $s^{-1}$, and most preferably from 10 to 200 $s^{-1}$. Here, the G value is a value led by the following formula.

$$G = \sqrt{\frac{P}{V \cdot \mu}}$$

where P represents the stirring power (W), V the volume of liquid ($m^3$), and $\mu$ the viscosity coefficient of liquid (Pa·s).

In the above-mentioned salting-out, a method of removing coagulates of the SS component coagulated can be any common solid-liquid separation method. It is particularly preferable to employ at least one method selected from the group consisting of filtration, decantation, centrifugal separation and gravitational sedimentation. The filtration may preferably be carried out under a pressure. It is also preferred to adopt a method wherein the waste water containing coagulates is left to stand still to let the coagulates settle and wherein the supernatant is filtered to remove the coagulates. Furthermore, from the viewpoint of easiness in the maintenance of the facilities or the like, the most preferably applicable method is a solid-liquid separation method by means of a thickener or a screw decanter.

In the present invention, the vacuum concentration of the aqueous solution (A) is carried out under a pressure of at most 100 kPa. The pressure is preferably at most 50 kPa, particularly preferably at most 30 kPa. If the pressure is too high, a high temperature is required to evaporate the water-based solvent, which can lead not only to failure in sufficient reduction of necessary energy, but also to evaporative loss of the fluorine-containing emulsifier together with the solvent because of the high temperature.

Furthermore, in the vacuum concentration according to the present invention, the temperature of the aqueous solution (A) to be adopted is at most 100° C. The temperature is preferably at most 80° C. If the temperature is too high, it will result in failure in sufficient reduction of necessary energy and also in evaporative loss of the fluorine-containing emulsifier together with the solvent because of the high temperature.

Since the coagulation waste water inside the apparatus foams with change of temperature, the fluctuation of temperature is preferably controlled within a range of ±2° C. relative to the set temperature.

In order to suppress the foaming, it is effective to add a conventional defoaming agent such as a silicone type defoamer. However, it can adversely affect physical properties of the fluorine-containing emulsifier reproduced, and it is thus preferable to avoid the use of the defoaming agent as much as possible.

In the present invention, an apparatus used for the vacuum concentration is preferably an apparatus capable of efficiently reusing vapor released by evaporation, so as to decrease energy consumption. Furthermore, the apparatus for carrying out the vacuum concentration is preferably such a vacuum concentrator that an energy amount required to evaporate a unit volume of the aqueous solution (A) is at most 50% of an energy amount required to evaporate a unit volume thereof under the atmospheric pressure. The apparatus may be a heating tube surface evaporation type concentrator equipped with a heat pump and/or a flash type concentrator equipped with an ejector.

In the case of the heating tube surface evaporation type concentrator equipped with the heat pump (hereinafter also referred to simply as a heating evaporator), the coagulation waste water (aA) is introduced into the heating evaporator kept in a pressure of at most 100 kPa, is sprayed, together with a circulating liquid present in the heating evaporator, from an upper portion of the heating evaporator to a heating tube portion by a circulation pump, and undergoes thin-film evaporation on the surface of the heating tube portion. On this occasion, a part of the circulating liquid is sprayed to near the surface of the liquid retained in the heating evaporator, whereby the foaming can be suppressed. Vapor released on the surface of the heating tube portion is compressed by the heat pump to increase the temperature thereof by from 3 to 6° C. The temperature-raised vapor is introduced to the inside of the heating evaporator to evaporate the circulating liquid sprayed to the outside of the heating tube portion and, at the same time, to become a condensate, to be discharged to the outside of the system by a condensate pump.

Namely, since the evaporated vapor is once heated up by the heat pump, the energy consumption can be reduced thereby as compared with a case using no heat pump. The heating tube surface evaporation type concentrator equipped with the heat pump can be a VVCC concentrator or EVCC concentrator manufactured by Sasakura Engineering Co., Ltd., for example.

The concentration of the fluorine-containing emulsifier can be increased to at least 5% by mass, and further to at least 10% by mass by means of the heating tube surface evaporation type concentrator equipped with the heat pump. In this case, because the heating tube surface evaporation type concentrator equipped with the heat pump has many heating tubes inside thereof, the increase in the concentration of the fluorine-containing emulsifier can result in precipitation of the fluorine-containing emulsifier on the surface of the heating tubes and adhesion of the SS component in the coagulation waste water (aA) thereto because of its structure, ending up with reduction of heat efficiency. Therefore, the concentration process by means of the heating tube surface evaporation type concentrator equipped with the heat pump is normally preferably carried out so that the concentration of the fluorine-containing emulsifier is confined to a level of from 1000 ppm by mass to 5% by mass, particularly preferably to a level of from 0.5 to 3% by mass.

In the present invention, the vacuum concentration of the aqueous solution (A) can also be carried out by a flash type concentrator (hereinafter also referred to simply as a flash evaporator). It is also possible to use a flash type concentrator equipped with an ejector (e.g., an FTC concentrator manufactured by Sasakura Engineering Co., Ltd. or the like). These flash type concentrators are free of the problem caused by the increase in the concentration of the fluorine-containing emulsifier as is posed in the heating evaporator, and therefore, they are normally preferably applicable to concentration of an aqueous solution containing the fluorine-containing emulsifier already in a relatively high concentration.

The vacuum concentration of the aqueous solution (A) in the present invention is preferably carried out in multiple steps of at least two. For example, the first step is carried out using the heating tube surface evaporation type concentrator equipped with the heat pump and, the second step and the steps subsequent thereto, if any, are carried out using the heating tube surface evaporation type concentrator equipped with the heat pump or using the flash type concentrator. Particularly, it is preferable to carry out the first step concentration by means of the heating tube surface evaporation type concentrator equipped with the heat pump and to carry out the second step and the subsequent steps by means of the flash type concentrator.

Normally, the aqueous solution of the fluorine-containing emulsifier already in a relatively high concentration through concentration with the heating evaporator is preferably further concentrated with the use of the flash evaporator. For example, when an aqueous solution of the fluorine-containing emulsifier already having a relatively high concentration is introduced into the flash evaporator kept in a pressure of at most 30 kPa, the aqueous solution thus introduced undergoes flash evaporation due to the reduced pressure inside the flash evaporator. In this case, the flash type concentrator equipped with the ejector such as the FTC concentrator can be used to aspirate a part of evaporated vapor to the ejector and to use it, together with drive steam of the ejector, as a heat source for the circulating liquid in a heater.

The condensed water discharged from the above vacuum concentration process according to the present invention can be used as an aqueous solution for washing when the waste gas from the above-mentioned drying process and/or heating treatment process of the fluoropolymer is washed to obtain the above-mentioned aqueous solution (A2a).

In the present invention, the concentration of the fluorine-containing emulsifier is highly increased in the aqueous solution (B) obtained in the above vacuum concentration process, as compared with that in the aqueous solution (A). The concentration of the fluorine-containing emulsifier in the aqueous solution (B) is normally preferably at least 5% by mass, particularly preferably at least 10% by mass. By making the concentration of the fluorine-containing emulsifier in the aqueous solution (B) fall within the above range, a recovery rate of the fluorine-containing emulsifier in the present invention can be at least 90% by mass. If the concentration of the fluorine-containing emulsifier in the aqueous solution (B) is too low, an amount corresponding to a solubility of a free acid of the fluorine-containing emulsifier relative to water cannot be recovered, so as to fail to achieve a sufficiently high recovery rate of the fluorine-containing emulsifier in the method from the vacuum concentration process to the recovery process. Furthermore, an upper limit of the concentration of the fluorine-containing emulsifier is not necessarily limited, but it is preferably at most 50% by mass.

In the present invention, the fluorine-containing emulsifier highly concentrated in the aqueous solution (B) can be precipitated in the form of a free acid by adjusting the pH of the aqueous solution (B) to an acidity of at most pH 4. The free acid precipitated can be recovered by filtration. For purification of the fluorine-containing emulsifier, the aqueous solution (B) can be made acidic to form a precipitate and in that state the fluorine-containing emulsifier can be readily extracted with a non-water-soluble organic solvent.

The non-water-soluble organic solvent can be at least one solvent selected from the group consisting of chloroform, dichloroethylene, methylene chloride, hexane, benzene, toluene, R-113, R-225ca, R-225cb, R-123, R-141b, $C_6F_{13}H$ and $C_8F_{18}$. From the viewpoint of the solubility of the free acid to the solvent, the solvent is particularly preferably at least one non-water-soluble, fluorine-containing organic solvent selected from the group consisting of R-113, R-225ca, R-225cb, R-123, R-141b, $C_6F_{13}H$ and $C_8F_{18}$.

The free acid extracted into the solvent can be purified by distillation with the solvent to remove impurities containing no fluorine. In addition, the free acid can be purified to remove fluorine-containing impurities, by recrystallization thereof with at least one solvent selected from the group consisting of chloroform, dichloroethylene, methylene chloride, hexane, benzene, toluene, R-113, R-225ca, R-225cb, R-123, R-141b, $C_6F_{13}H$ and $C_8F_{18}$.

The recovery of the fluorine-containing emulsifier from the above aqueous solution (B) in the present invention is particularly preferably carried out an extraction method with the non-water-soluble, fluorine-containing organic solvent.

The fluorine-containing emulsifier thus purified can be reused as the emulsifier for polymerization for a fluoropolymer.

In the present invention, the fluorine-containing emulsifier is preferably a salt of a perfluoroalkanoic acid, a ω-hydroperfluoroalkanoic acid, a ω-chloroperfluoroalkanoic acid, a perfluoroalkanesulfonic acid, or the like, having from 5 to 13 carbon atoms. Such a salt may be of a linear chain structure or a branched chain structure, or may be of a mixture of such structures. Furthermore, it may contain an etheric oxygen atom in its molecule. If the number of carbon atoms is within this range, the salt will present excellent effects as an emulsifier. The salt of such an acid is preferably an alkali metal salt such as a lithium salt, a sodium salt or a potassium salt, or an ammonium salt, more preferably an ammonium salt or a sodium salt, and most preferably an ammonium salt.

Specific examples of the above acids include perfluoropentanoic acid, perfluorohexanoic acid, perfluoroheptanoic acid, perfluorooctanoic acid, perfluorononanoic acid, perfluorodecanoic acid, perfluorododecanoic acid, ω-hydroperfluoroheptanoic acid, ω-hydroperfluorooctanoic acid, ω-hydroperfluorononanoic acid, ω-chloroperfluoroheptanoic acid, ω-chloroperfluorooctanoic acid and ω-chloroperfluorononanoic acid.

Other specific examples of the above acids include $CF_3CF_2CF_2OCF(CF_3)COOH$, $CF_3CF_2CF_2OCF(CF_3)CF_2OCF(CF_3)COOH$, $CF_3CF_2CF_2O[CF(CF_3)CF_2O]_2CF(CF_3)COOH$, $CF_3CF_2CF_2O[CF(CF_3)CF_2O]_3CF(CF_3)COOH$ and $CF_3CF_2CF_2CF_2CF_2OCF(CF_3)COOH$. Still other specific examples include perfluorohexanesulfonic acid, perfluoroheptanesulfonic acid, perfluorooctanesulfonic acid, perfluorononanesulfonic acid and perfluorodecanesulfonic acid.

Specific examples of the ammonium salt include ammonium perfluoropentanoate, ammonium perfluorohexanoate, ammonium perfluoroheptanoate, ammonium perfluorooctanate (APFO), ammonium perfluorononanoate, ammonium perfluorodecanoate, ammonium perfluorododecanoate, ammonium ω-hydroperfluoroheptanoate, ammonium ω-hydroperfluorooctanoate, ammonium ω-hydroperfluorononanoate, ammonium ω-chloroperfluoroheptanoate, ammonium ω-chloroperfluorooctanoate and ammonium ω-chloroperfluorononanoate.

Other specific examples of the above ammonium salt include $CF_3CF_2CF_2OCF(CF_3)COONH_4$, $CF_3CF_2CF_2OCF(CF_3)CF_2OCF(CF_3)COONH_4$, $CF_3CF_2CF_2O[CF(CF_3)CF_2O]_2CF(CF_3)COONH_4$, $CF_3CF_2CF_2O[CF(CF_3)CF_2O]_3CF(CF_3)COONH_4$ and $CF_3CF_2CF_2CF_2CF_2OCF(CF_3)COONH_4$. Still other specific examples include ammonium perfluorohexanesulfonate, ammonium perfluoroheptanesulfonate, ammonium perfluorooctanesulfonate, ammonium perfluorononanesulfonate and ammonium perfluorodecanesulfonate.

Specific examples of the lithium salt include lithium perfluoropentanoate, lithium perfluorohexanoate, lithium perfluoroheptanoate, lithium perfluorooctanoate, lithium perfluorononanoate, lithium perfluorodecanoate, lithium perfluorododecanoate, lithium ω-hydroperfluoroheptanoate, lithium ω-hydroperfluorooctanoate, lithium ω-hydroperfluorononanoate, lithium ω-chloroperfluoroheptanoate, lithium ω-chloroperfluorooctanoate and lithium ω-chloroperfluorononanoate.

Other specific examples of the above lithium salt include $CF_3CF_2CF_2OCF(CF_3)COOLi$, $CF_3CF_2CF_2OCF(CF_3)CF_2OCF(CF_3)COOLi$, $CF_3CF_2CF_2O[CF(CF_3)CF_2O]_2CF(CF_3)COOLi$, $CF_3CF_2CF_2O[CF(CF_3)CF_2O]_3CF(CF_3)COOLi$ and $CF_3CF_2CF_2CF_2CF_2OCF(CF_3)COOLi$. Still other specific examples include lithium perfluorohexanesulfonate, lithium perfluoroheptanesulfonate, lithium perfluorooctanesulfonate, lithium perfluorononanesulfonate and lithium perfluorodecanesulfonate.

Specific examples of the sodium salt include sodium perfluoropentanoate, sodium perfluorohexanoate, sodium perfluoroheptanoate, sodium perfluorooctanoate, sodium perfluorononanoate, sodium perfluorodecanoate, sodium perfluorododecanoate, sodium ω-hydroperfluoroheptanoate, sodium ω-hydroperfluorooctanoate, sodium ω-hydroperfluorononanoate, sodium ω-chloroperfluoroheptanoate, sodium ω-chloroperfluorooctanoate and sodium ω-chloroperfluorononanoate.

Other specific examples of the above sodium salt include $CF_3CF_2CF_2OCF(CF_3)COONa$, $CF_3CF_2CF_2OCF(CF_3)CF_2OCF(CF_3)COONa$, $CF_3CF_2CF_2O[CF(CF_3)CF_2O]_2CF(CF_3)COONa$, $CF_3CF_2CF_2O[CF(CF_3)CF_2O]_3CF(CF_3)COONa$ and $CF_3CF_2CF_2CF_2CF_2OCF(CF_3)COONa$. Still other specific examples include sodium perfluorohexanesulfonate, sodium perfluoroheptanesulfonate, sodium perfluorooctanesulfonate, sodium perfluorononanesulfonate and sodium perfluorodecanesulfonate.

Specific examples of the potassium salt include potassium perfluoropentanoate, potassium perfluorohexanoate, potassium perfluoroheptanoate, potassium perfluorooctanoate, potassium perfluorononanoate, potassium perfluorodecanoate, potassium perfluorododecanoate, potassium ω-hydroperfluoroheptanoate, potassium ω-hydroperfluorooctanoate, potassium ω-hydroperfluorononanoate, potassium ω-chloroperfluoroheptanoate, potassium ω-chloroperfluorooctanoate and potassium ω-chloroperfluorononanoate.

Other specific examples of the above potassium salt include $CF_3CF_2CF_2OCF(CF_3)COOK$, $CF_3CF_2CF_2OCF(CF_3)CF_2OCF(CF_3)COOK$, $CF_3CF_2CF_2O[CF(CF_3)CF_2O]_2CF(CF_3)COOK$, $CF_3CF_2CF_2O[CF(CF_3)CF_2O]_3CF(CF_3)COOK$ and $CF_3CF_2CF_2CF_2CF_2OCF(CF_3)COOK$. Still other specific examples include potassium perfluorohexanesulfonate, potassium perfluoroheptanesulfonate, potassium perfluorooctanesulfonate, potassium perfluorononanesulfonate and potassium perfluorodecanesulfonate.

In the present invention, the fluorine-containing emulsifier is particularly preferably an ammonium salt of a perfluoroalkanoic acid having from 6 to 12 carbon atoms, more preferably ammonium perfluoroheptanoate, APFO, ammonium perfluorononanoate, or ammonium perfluorodecanoate, and most preferably APFO.

Specific examples of the fluoromonomer include fluoroethylenes such as tetrafluoroethylene (hereinafter referred to as TFE), $CF_2$=$CFCl$, $CFH$=$CF_2$, $CFH$=$CH_2$ and $CF_2$=$CH_2$ (hereinafter referred to as VdF), fluoropropylenes such as hexafluoropropylene (hereinafter referred to as HFP) and $CF_2$=$CHCF_3$, perfluorovinyl ethers having from 3 to 10 carbon atoms, such as $CF_2$=$CFOCF_3$, $CF_2$=$CFO(CF_2)_2CF_3$ (hereinafter referred to as PPVE) and $CF_2$=$CFO(CF_2)_4CF_3$, and (perfluoroalkyl)ethylenes having from 4 to 10 carbon atoms, such as $CH_2$=$CH(CF_2)_3CF_3$. These fluoromonomers may be used singly or in combination as a mixture of two or more of them.

Specific examples of the monomer other than the fluoromonomer include vinyl esters such as vinyl acetate, vinyl ethers such as ethyl vinyl ether, cyclohexyl vinyl ether and hydroxybutyl vinyl ether, monomers having a cyclic structure such as norbornene and norbornadiene, allyl ethers such as methyl allyl ether, and olefins such as ethylene (hereinafter referred to as E), propylene (hereinafter referred to as P) and isobutylene. The monomers other than the fluoromonomers may be used singly or in combination as a mixture of two or more of them.

In the present invention, there are no particular restrictions on the fluoropolymer, and it is preferably at least one member selected from the group consisting of PTFE, a TFE/P copolymer, a TFE/P/VdF copolymer, a TFE/HFP copolymer, a TFE/PPVE copolymer, an E/TFE copolymer and a polyvinylidene fluoride. The fluoropolymer is more preferably PTFE, a TFE/P copolymer, a TFE/P/VdF copolymer or a TFE/PPVE copolymer, and is most preferably PTFE.

The method for recovering the fluorine-containing emulsifier in the present invention is particularly effective to the aqueous solution (A) containing the fluorine-containing emulsifier in the concentration of at least 1 ppm by mass and at most 1% by mass, but it is also applicable to an aqueous solution containing the fluorine-containing emulsifier in a relatively low concentration (for example, from more than 1% by mass to less than 5% by mass). Namely, an aqueous solution containing a fluorine-containing emulsifier in a relatively low concentration can be highly concentrated by the vacuum concentration according to the present invention (for example, to at least 5% by mass, particularly to at least 10% by mass). Furthermore, the method for recovering the fluorine-containing emulsifier according to the present invention is not applicable only to the above-mentioned fluorine-containing emulsifiers but is also applicable to a low-molecular-weight fluorine-containing carboxylic acid, such as trifluoroacetic acid and pentafluoropropanic acid, and/or a salt thereof, trifluoromethanesulfonic acid and/or a salt thereof, and so on.

Now, the present invention will be described in further detail with reference to Examples. However, it should be understood that the present invention is by no means restricted thereto. Here, the concentration of APFO, perfluorooctanoic acid or sodium perfluorooctanoate was measured by means of a high performance liquid chromatography mass spectrum method using a mixed solution of methanol and water as a solvent. The species to be detected by this method is perfluorooctanoate ($C_7F_{15}COO^-$).

Measurement of SS Component in Waste Water (Unit: % by Mass)

10 g of coagulation waste water obtained after coagulating and separating PTFE from an aqueous dispersion liquid of PTFE, was put into a halogen type water content meter HR-73, manufactured by METTLER TOLEDO K.K., and was dried until the mass became constant at 200° C. The evaporation residue thereafter was taken as the SS component. Since PFOA and APFO both sublimate at this temperature, they are not counted as the SS component.

In the examples and comparative examples below, ppm, %, and the like are based on mass unless otherwise noted.

EXAMPLE 1

In coagulation waste water obtained after an emulsion polymerization of PTFE (containing 2,300 ppm of the SS component, hereinafter referred to as coagulation waste water 1), a concentration of APFO was measured and found to be 208 ppm. 65.0 g of aluminum chloride hexahydrate was added to 1,000 L (liters) of the coagulation waste water 1 under stirring to coagulate non-coagulated PTFE particles, and the stirring was continued for ten minutes. Then the pH of the coagulation waste water 1 was adjusted to 10.0 with 2N sodium hydroxide. After stopping the stirring and leaving the water to stand still for 15 hours, the supernatant of the waste water was colorless and transparent, and the SS component therein was 20 ppm. The APFO concentration in the supernatant of the waste water was 201 ppm.

The APFO-containing waste water from which PTFE had preliminarily been removed (hereinafter referred to simply as the waste water) was subjected to vacuum concentration by means of a heating tube surface evaporation type concentrator equipped with a heat pump (trade name: EVCC concentrator manufactured by Sasakura Engineering Co., Ltd.). A supply amount of the waste water was 50 L/hour and the interior of the EVCC concentrator was kept at 20 kPa. Furthermore, a circulating liquid inside the EVCC concentrator was kept at a temperature of 65±2° C. Immediately after starting the operation, the liquid inside the EVCC concentrator began to foam, but did not foam as much as it overflowed. 750 L of the waste water was introduced into the EVCC concentrator over 15 hours to obtain 20 L of 37.5-fold concentrated water. Water evaporated was condensed and the entire amount of water was collected to analyze, whereby the APFO concentration was found to be 1 ppm. From this result, APFO lost in the vacuum concentration by the EVCC concentrator was 0.48% (0.73 g). Energy used in the EVCC concentrator was 3.42 kW.

The 37.5-fold concentrated water concentrated by the EVCC concentrator was further concentrated by means of a flash type concentrator equipped with an ejector (trade name: FTC concentrator manufactured by Sasakura Engineering Co., Ltd.). The pressure inside the FTC concentrator was kept at 20 kPa during the concentrating operation. The temperature was kept at 50±2° C. 20 L of the 37.5-fold concentrated water was concentrated to 1.0 L of 750-fold concentrated water over 20 hours. All the condensed water discharged from the FTC concentrator was recovered and the APFO concentration was measured and found to be 1 ppm. From this result, APFO lost by the FTC concentrator was 0.013% (0.019 g). Energy used in the FTC concentrator was 28.2 kW. The APFO concentration in the 750-fold concentrated water was 15.0%.

The 750-fold concentrated water was opaque and whitish and white precipitates were recognized in an amount of about 16% by volume. The pH was 11.9. Concentrated sulfuric acid was added to the 750-fold concentrated water to adjust the pH to 1. The concentrated water was stirred with an anchor impeller during the addition of the sulfuric acid. From a point of time when the pH fell below 4, a large amount of a white suspended solid was generated in the concentrated water. The pH was adjusted to 1 and thereafter the concentrated water was stirred for 30 minutes. 100 g of R-225cb was added to the concentrated water adjusted to the pH of 1. White precipitates generated in the concentrated water were dissolved in the R-225cb phase. The R-225cb phase was subjected to liquid separation and the entire amount of R-225cb was evaporated at room temperature to obtain 143.1 g of a white solid. It was analyzed by infrared spectroscopic analysis, and the white solid was found to be perfluorooctanoic acid. The recovery rate of the APFO by the concentrating operation with the use of the EVCC concentrator and the FTC concentrator was 99%.

EXAMPLE 2

PTFE produced by an emulsion polymerization using APFO as an emulsifier, was coagulated. 10.0 kg of this wet PTFE powder (percentage of water content: 48% by mass) was put in a hot-air circulating oven and the temperature was raised with time from 100° C. at a rate of 5° C./min. Thereafter, it was thermally treated at 200° C. for one hour. An emission volume of waste gas from the hot-air circulating oven was 4.5 Nm$^3$/h. The entire amount of the waste gas was introduced into a spraying tower having a diameter of 50 cm and a height of 500 cm. A linear velocity of the gas at this time was about 0.5 m/sec. 35 kg of ion-exchanged water adjusted to the pH of 10 with sodium hydroxide was circulated and sprayed in the spraying tower. After completion of the drying and heating treatment of the PTFE powder, the APFO concentration in the alkali water inside the spraying tower was analyzed and found to be 498 ppm by mass.

A 0.2N sodium hydroxide aqueous solution was added to the APFO-containing aqueous solution to adjust the pH to 10.0. The temperature of the liquid was 26° C. The APFO-containing waste water was subjected to vacuum concentration by means of a heating tube surface evaporation type concentrator equipped with a heat pump (trade name: EVCC concentrator manufactured by Sasakura Engineering Co., Ltd.). A supply amount of the APFO-containing waste water was 10 L/hour and the interior of the EVCC concentrator was kept at 20 kPa. A circulating liquid inside the EVCC concentrator was kept at a temperature of 65±2° C. 35 L of the APFO-containing waste water was introduced into the EVCC concentrator over 4 hours to obtain 2 L of 17.5-fold concentrated water. Water evaporated was condensed and the entire amount of water was collected to analyze, whereby the APFO concentration was found to be 1 ppm. From this result, APFO lost in the concentration by the EVCC concentrator was 0.011% (0.002 g). Energy used in the EVCC concentrator was 0.158 kW.

The 17.5-fold concentrated water concentrated by the EVCC concentrator was further concentrated by a rotary evaporator. The pressure inside the rotary evaporator was kept at 20 kPa. The temperature was kept at 50±2° C. This 17.5-fold concentrated water was concentrated to 0.15 L of 233-fold concentrated water over two hours. All the condensed water discharged from the rotary evaporator was collected and the APFO concentration was measured and found to be 1 ppm. From this result, APFO lost by the rotary evaporator was 0.013% (0.0024 g). Energy used in the rotary evaporator was 1.40 kW. The APFO concentration in the 233-fold concentrated water was 11.6%.

The 233-fold concentrated water was opaque and whitish and white precipitates were recognized in an amount of 17% by volume. The pH was 11.4. Concentrated sulfuric acid was added to the 233-fold concentrated water to adjust the pH to 1. The concentrated water was stirred with an anchor impeller during the addition of the sulfuric acid. From a point of time when the pH fell below 4, a large amount of a white suspended solid was generated in the concentrated water. The pH was adjusted to 1 and thereafter the concentrated water was stirred for 30 minutes. 10 g of n-$C_8F_{18}$ was added to the concentrated water adjusted to the pH of 1. White precipitates generated in the concentrated water were dissolved in the n-$C_8F_{18}$ phase. The n-$C_8F_{18}$ phase was subjected to liquid separation and the entire amount of n-$C_8F_{18}$ was evaporated at room temperature to obtain 16.5 g of a white solid. It was analyzed by infrared spectroscopic analysis, and the white solid was found to be perfluorooctanoic acid. The recovery rate of the APFO by the concentrating operation with the use of the EVCC concentrator and the rotary evaporator was 99%.

EXAMPLE 3

200 L of waste water (SS component: 50 ppm, APFO content: 780 ppm) of a TFE/HFP/VdF$_2$ copolymer was adjusted to the pH of 10.0 with a 2N potassium hydroxide aqueous solution.

This APFO-containing waste water was concentrated by a flash type concentrator equipped with an ejector (trade name: FTC concentrator manufactured by Sasakura Engineering Co., Ltd.). The pressure inside the FTC concentrator during the concentrating operation was kept at 20 kPa. The temperature was kept at 60±2° C. 200 L of the APFO-containing waste water was concentrated to 1.0 L of 200-fold concentrated water over 100 hours. All the condensed water discharged from the FTC concentrator was collected, and the APFO concentration was measured and found to be 1 ppm. From this result, APFO lost by the FTC concentrator was 0.13% (0.198 g). Energy used in the FTC concentrator was 154.4 kW. The APFO concentration in the 200-fold concentrated water was 15.6%.

The 200-fold concentrated water was opaque and whitish and white precipitates were recognized in an amount of 16% by volume. The pH was 11.2. Concentrated sulfuric acid was added to the 200-fold concentrated water to adjust the pH to 1. The concentrated water was stirred with an anchor impeller during the addition of the sulfuric acid. From a point of time when the pH fell below 4, a large amount of a white suspended solid was generated in the concentrated water. The pH was adjusted to 1 and thereafter the concentrated water was stirred for 30 minutes. 100 g of R-225cb was added to the concentrated water adjusted to the pH of 1. White precipitates generated in the concentrated water were dissolved in the R-225cb phase. The R-225cb phase was subjected to liquid separation and the entire amount of R-225cb was evaporated at room temperature to obtain 148.6 g of a white solid. It was analyzed by infrared spectroscopic analysis, and the white solid was found to be perfluorooctanoic acid. The recovery rate of the APFO by the concentrating operation with the use of the FTC concentrator was 99%.

COMPARATIVE EXAMPLE

In coagulation waste water obtained after an emulsion polymerization of PTFE (containing 2300 ppm of the SS component), a concentration of APFO was measured and found to be 148 ppm. 65.0 g of aluminum chloride hexahydrate was added to 1,000 L of the coagulation waste water to coagulate non-coagulated PTFE particles. Then the pH of the waste water was adjusted to 10.0 with 0.2N sodium hydroxide. After the waste water was left to stand still for 15 hours, the supernatant of the waste water was colorless and transparent, and the SS component therein was 20 ppm. The APFO concentration in the supernatant of the waste water was 141 ppm.

10 L of the coagulation waste water from which the SS component had preliminarily been removed, was put into a round-bottom flask of glass with an inner volume of 20 L provided with a condenser. The round-bottom flask was heated at 120° C. in an oil bath to concentrate the coagulation waste water. This operation was repeated 75 times and 750 L of the coagulation waste water was concentrated to 1.3 L. The concentration rate was 577-fold. A white solid adhered to the interior of the condenser during the concentrating operation and it was necessary to wash the inside once per ten supplies of the coagulation waste water. The water used for washing this condenser was analyzed and found that the white solid adhered was APFO. Energy used in the concentrating operation was 584 kW.

The 577-fold concentrated water was opaque and whitish and white precipitates were recognized in an amount of 15% by volume. The pH was 11.5. The entire amount of the 577-fold concentrated water was filtered with a filter paper having an average aperture of 10 µm. The filtrate was a slightly viscous, light yellow liquid. The APFO concentration in the filtrate was measured and found to be 4.8% by mass (62.4 g), and the recovery was 59.0%. The entire amount of the filtrate was put into a glass beaker having an inner volume of 2 L and 1N hydrochloric acid was added to adjust the pH to 1. Stirring was carried out by an anchor impeller during the addition of the hydrochloric acid. From a point of time when the pH fell below 4, a large amount of a white suspended solid was generated in the concentrated water. The pH was adjusted to 1 and thereafter the concentrated water was stirred for 30 minutes. 200 g of R-225cb was added to the concentrated water adjusted to the pH of 1. White precipitates generated in the concentrated water were dissolved in the R-225cb phase. The R-225cb phase was subjected to liquid separation and the entire amount of R-225cb was evaporated at room temperature to obtain 61.6 g of a white solid. It was analyzed by infrared spectroscopic analysis, and this white solid was found to be perfluorooctanoic acid.

INDUSTRIAL APPLICABILITY

According to the recovering method of the fluorine-containing emulsifier of the present invention, the fluorine-containing emulsifier can be efficiently and simply recovered from coagulation waste water of a fluoropolymer. Furthermore, no other chemical substance needs to be added and the recovery efficiency is also high, as compared with the conventional recovery methods.

The entire disclosure of Japanese Patent Application No. 2002-178728 filed on Jun. 19, 2002 including specification, claims and summary is incorporated herein by reference in its entirety.

What is claimed is:

1. A method for recovering a fluorine-containing emulsifier, which comprises subjecting an aqueous solution (A) containing a fluorine-containing emulsifier in a concentration of at least 1 ppm by mass and at most 1% by mass, to vacuum concentration under a pressure of at most 100 kPa and a temperature of the aqueous solution (A) of at most 100° C., to obtain a concentrated aqueous solution (B) containing the fluorine-containing emulsifier in a higher concentration, and recovering the fluorine-containing emulsifier from the aqueous solution (B).

2. The method according to claim 1, wherein the concentration of the fluorine-containing emulsifier is at least 5% by mass in the aqueous solution (B).

3. The method according to claim 1, wherein the aqueous solution (A) is at least one member selected from the group consisting of a waste water (A1) obtained after separation of a fluoropolymer in a process for producing the fluoropolymer by an emulsion polymerization or an aqueous dispersion polymerization of at least one kind of fluoromonomer in an aqueous medium containing the fluorine-containing emulsifier, and an aqueous solution (A2) containing the fluorine-containing emulsifier obtained by washing with an aqueous solution a waste gas from a drying process and/or a heat treating process of the fluoropolymer.

4. The method according to claim 1, wherein the vacuum concentration is carried out in multiple steps of at least two.

5. The method according to claim 1, wherein the fluorine-containing emulsifier is recovered from the aqueous solution (B) by an extraction method using a non-water-soluble fluorine-containing organic solvent.

6. The method according to claim 1, wherein the aqueous solution (A) is a waste water (A1) obtained after separation of a fluoropolymer in a process for producing the fluoropolymer by an emulsion polymerization and wherein a content of a suspended solid and a substance convertible to a suspended solid in the waste water (A1) is at most 0.3% by mass.

7. The method according to claim 1, wherein an apparatus for carrying out the vacuum concentration is a heating tube surface evaporation type concentrator equipped with a heat pump.

8. The method according to claim 1, wherein an apparatus for carrying out the vacuum concentration is a flash type concentrator.

9. The method according to claim 4, wherein the vacuum concentration carried out in the multiple steps of at least two comprises a first step carried out by a heating tube surface evaporation type concentrator equipped with a heat pump, and a second step and a subsequent step, if any, carried out by a heating tube surface evaporation type concentrator equipped with a heat pump or by a flash type concentrator.

10. The method according to claim 3, wherein the fluoropolymer is at least one member selected from the group consisting of a polytetrafluoroethylene, a tetrafluoroethylene/ethylene copolymer, a tetrafluoroethylene/propylene copolymer, a tetrafluoroethylene/propylene/vinylidene fluoride copolymer, a tetrafluoroethylene/hexafluoropropylene copolymer, a tetrafluoroethylene/$CF_2$=$CFO(CF_2)_2CF_3$ copolymer and a polyvinylidene fluoride.

11. The method according to claim 1, wherein the fluorine-containing emulsifier is a salt of an acid which has from 5 to 13 carbon atoms, which may have an etheric oxygen atom in its molecule, and which is at least one member selected from the group consisting of a perfluoroalkanoic acid, a ω-hydroperfluoroalkanoic acid, a ω-chloroperfluoroalkanoic acid and a perfluoroalkanesulfonic acid.

12. The method according to claim 11, wherein the salt is at least one member selected from the group consisting of a sodium salt, a potassium salt, a lithium salt and an ammonium salt.

13. The method according to claim 1, wherein the fluorine-containing emulsifier is an ammonium salt of perfluoroalkanoic acid having from 6 to 12 carbon atoms.

14. The method according to claim 1, wherein the fluorine-containing emulsifier is ammonium perfluorooctanoate (APFO).

15. The method according to claim 9, wherein the vacuum concentration carried out by the heat tube surface evaporation type concentrator is conducted under the pressure of at most 20 kPa and the temperature of the aqueous solution (A) of at most 67° C., and wherein the vacuum concentration carried out by the flash type concentrator is conducted under the pressure of at most 20 kPa and the temperature of the aqueous solution (A) of at most 52° C.

16. The method according to claim 15, wherein the concentration of the fluorine-containing emulsifier is at least 15% by mass in the aqueous solution (B).

* * * * *